United States Patent [19]

Huardeau

[11] 4,172,789
[45] Oct. 30, 1979

[54] PROCESS FOR CLARIFYING LIQUIDS LOADED WITH SOLID SUBSTANCES IN SUSPENSION

[75] Inventor: Jacques Huardeau, Thorigny-sur-Marne, France

[73] Assignee: COPEF, Saint Maur, France

[21] Appl. No.: 854,474

[22] Filed: Nov. 23, 1977

[51] Int. Cl.² ............................................. B01D 21/08
[52] U.S. Cl. ..................................... 210/84; 210/322; 210/522
[58] Field of Search ................. 210/84, 259, 294, 322, 210/521, 522

[56] References Cited

U.S. PATENT DOCUMENTS

| | | | |
|---|---|---|---|
| 2,573,615 | 10/1951 | Seailles | 210/84 X |
| 3,399,135 | 8/1968 | Conley, Jr. et al. | 210/521 X |
| 3,425,913 | 2/1969 | Holden | 210/521 X |
| 3,953,332 | 4/1976 | Saeth et al. | 210/521 X |

FOREIGN PATENT DOCUMENTS

407374 12/1924 Fed. Rep. of Germany .

*Primary Examiner*—John Adee
*Attorney, Agent, or Firm*—Birch, Stewart, Kolasch & Birch

[57] ABSTRACT

A process and apparatus for clarifying a liquid loaded with suspended solid substances by decanting said substances, wherein the liquid to be treated is caused to flow along a flow path at least one portion of which is an upwardly directed flow path portion having a geometrical axis inclined with respect to the horizontal, said flow path portion being defined within an enclosure in which said liquid flows between plates arranged in at least two groups, each group containing substantially equidistant positioned plates disposed parallel to said inclined axis, said plates of each one of said groups being parallel to each other, and the parallel plates of each group forming with the vertical plane comprising said inclined axis an angle different from 90 degrees, while forming with the plates of the other group an angle of between about 20 degrees and 75 degrees, whereby the suspended substances are deposited on said plates and then slide downwardly thereon toward the wall of said enclosure.

14 Claims, 8 Drawing Figures

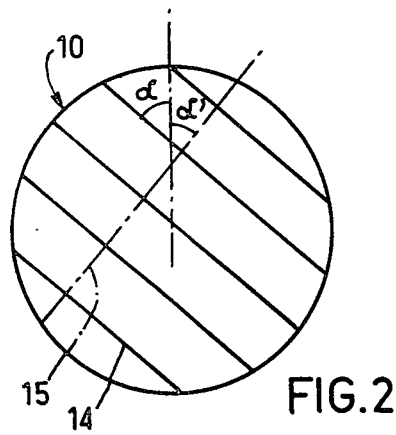
FIG. 2
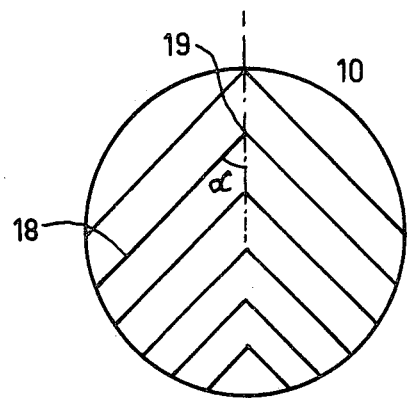
FIG. 3
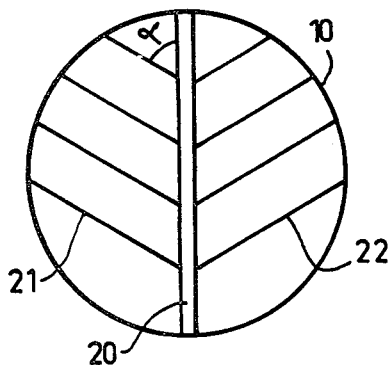
FIG. 4
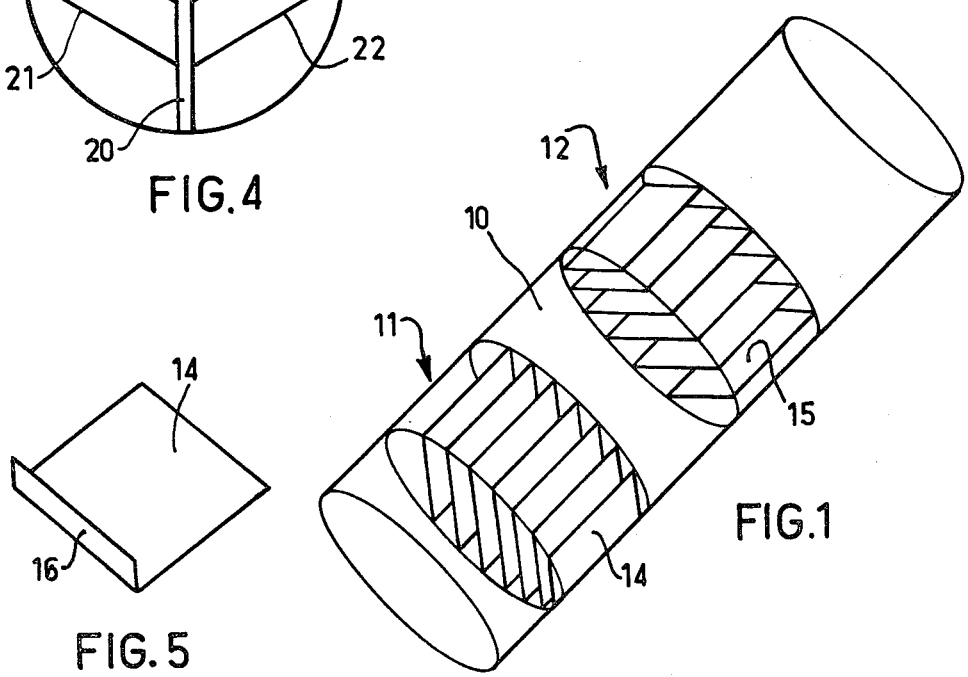
FIG. 5
FIG. 1

PROCESS FOR CLARIFYING LIQUIDS LOADED WITH SOLID SUBSTANCES IN SUSPENSION

The present invention is related to a process of clarifying liquids loaded with solid substances in suspension by accelerated sedimentation or decantation. The invention is also related to a device for carrying out said process.

For decanting and clarifying liquids containing suspended solid particles it is known to use static or hydrodynamic decanters wherein the loaded liquid is circulated along a horizontal or vertical flow path, or decanters wherein the decanted solid matter is recycled.

Some of these known decanters allow of an accelerated decantation and are therefore operated in such a manner that the liquid to be treated is propulsed and/or that said liquid is submitted to controlled stirring while the solid matter is predecanted. It is also known to cause the liquid to flow upwardly between parallel plates inclined under an angle of 45° to 70° with reference to the horizontal; this latter arrangement may be combined with the previously mentioned decanting means.

According to an improved known method the decantation is performed, possibly in combination with chemical floculation, in devices comprising a cylindrical or parallelepipedic body inclined under an angle of 40° to 60° with respect to the horizontal. It has been noted that such devices allow of achieving an improved yield when their upper part is provided with bundles of tubes having any convenient diameter wherein the decantation takes place.

Furthermore, it has been found that in these tubes the concentration and consequently the separation of the solid substances was improved and accelerated, as compared to the concentration and separation of said solid substances achieved when using inclined parallel plates.

One of the advantages of these known decanters resides in the fact that they can operate under pressure, due to the configuration of the devices and to the decrease of their volume which is rendered possible on account of the efficiency of the method.

The present invention is aimed at providing a clarifying device allowing a still faster clarification by decantation, than that which can be obtained with the known devices. This is achieved by the novel method according to the invention which provides for accelerated sedimentation of the solid substances suspended in a liquid to be clarified.

It is one object of the present invention to provide a process of clarifying liquids loaded with suspended solid substances by decanting and possibly floculating said substances, comprising the steps of causing the liquid to be treated to flow along a flow path at least one portion of which is an upwardly directed flow path portion having an inclined geometrical axis and being defined within an enclosure wherein said liquid flows between plates arranged in at least one group of plates parallel to said inclined axis, said plates being parallel to each other and forming with the vertical plane comprising said inclined axis an angle different from 90°, whereby the suspended substances deposited on said plates slide downwardly on said plates and toward the wall of said enclosure.

Another object of the invention is to provide a process wherein said liquid to be treated is caused to flow along a flow path comprising two upwardly directed path portions having a common inclined geometrical axis and being defined within said enclosure by two groups of plates, the plates of each group being parallel to each other and to said inclined axis, and said plates of each one of said groups forming with the vertical plane containing said axis respective angles different from 90°, while the plates of one of said groups are inclined with respect to each other so as to form an angle comprised between 20° and 75°.

Yet another object of the invention is to provide a device for carrying out the above-defined process, which device comprises a cylindrical body having an axis inclined with respect to the horizontal plane and defining an upwardly directed flow path for liquid to be treated, said body containing at least one group of plates parallel to said axis which form with the vertical plane containing said axis an angle different from 90°.

Still another object of the invention is to provide a device wherein said plates are equidistant.

In an advantageous embodiment of the invention said plates form an angle of 45° to 70° with said vertical plane comprising said inclined axis.

In another embodiment of the invention said body contains two groups of parallel plates, the plates of each group forming with said vertical plane an angle different from 90°, and the plates of one of said groups forming with the plates of the other group an angle comprised between 20° and 75°.

In still another embodiment of the invention one of said groups of plates is located downstream of the other group.

In yet another embodiment of the invention said two groups of plates are located on respective sides of said vertical plane, each plate of one of said groups being connected along a line located in said vertical plane to a corresponding plate of the other group.

In this embodiment the novel device may comprise a wall member located within said cylindrical body and extending in said vertical plane, and separating said two groups of plates.

In another embodiment of the invention the device further comprises a bundle of tubes parallel to each other and to said inclined geometrical axis, said tubes being located downstream of said plates.

The novel device further may comprise means for floculating and recycling the solid substances separated from said liquid by decantation.

In one particular embodiment the device according to the invention is provided with plates of the above-mentioned kind each one of which has an upwardly bent portion at its lower end for causing said solid substances to flow toward the wall of said cylindrical body.

In yet another embodiment of the novel device comprising a bundle of tubes as mentioned herein-above, the ends of the tubes of said bundle are contained in a plane which forms an angle different from 90° with said inclined geometrical axis of said cylindrical body, and which is located between a horizontal plane and a plane perpendicular to said inclined axis. In the device according to the invention the above-mentioned two groups of plates may be juxtaposed so that the upstream end of the uppermost one of said groups engages the downstream end of the lowermost one of said groups.

In another embodiment of the device according to the invention said two groups of plates are spaced from each other in the direction of said inclined geometrical axis of the above-mentioned cylindrical body.

Other features and advantages of the invention will become apparent from the description herein-below which refers to the appended drawings wherein various embodiments of the invention are shown, by way of illustration but not of limitation.

FIG. 1 schematically shows one embodiment of a decanter or clarifying device according to the invention, this device having a cylindrical configuration.

FIGS. 2 to 4 show various arrangements of the decanting plates provided in the device according to the invention.

FIG. 5 shows a particular embodiment of a decanting plate such as used in the novel clarifying device.

Figure 6:
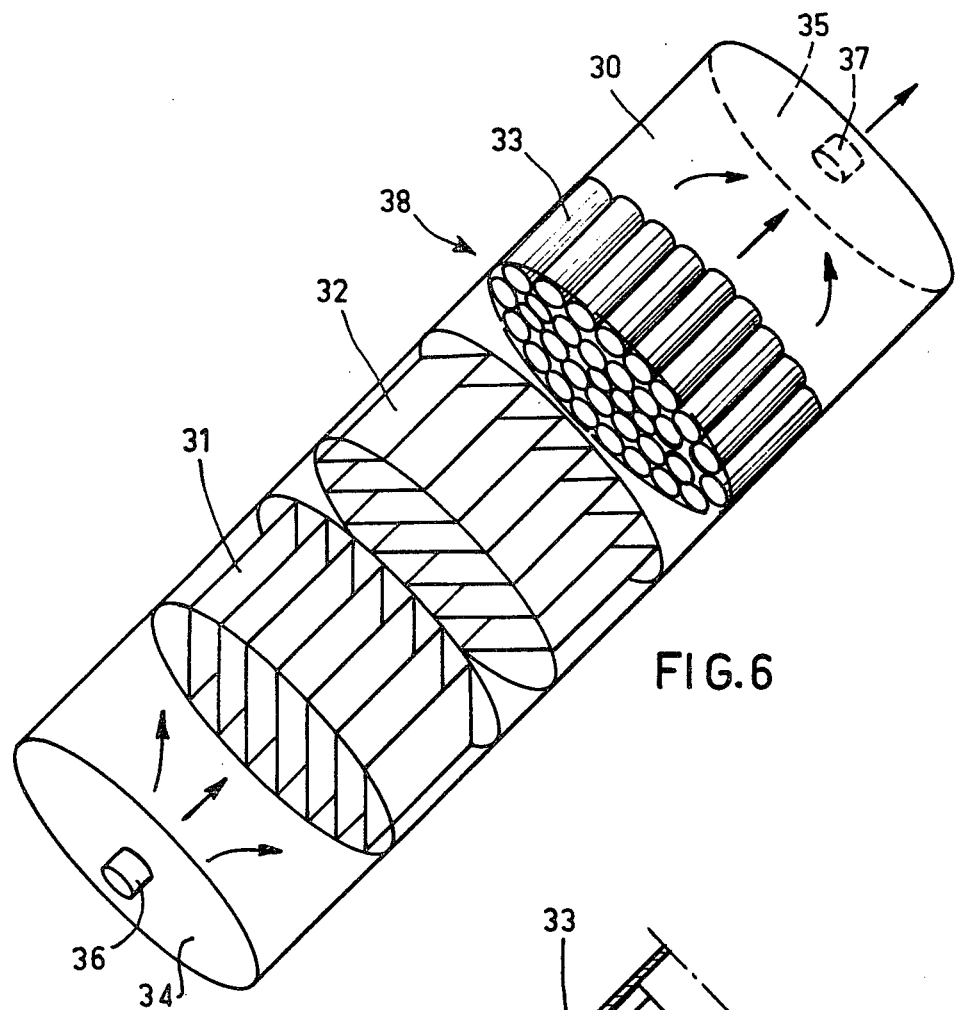
FIG. 6 shows another embodiment of the clarifying device according to the invention wherein the plates are associated with a bundle of tubes.

In the embodiment shown in FIG. 1 the clarifying device according to the invention comprises a cylindrical body 10 containing two groups of plates 11 and 12, each group being constituted by plates 14 and 15, respectively, and each plate being fixed to body 10 at two opposite edges.

Body 10 is inclined with respect to the horizontal plane under an angle comprised between 40° and 60°; during operation an upwardly directed current of liquid to be treated—i.e. liquid to be clarified—flows through said body.

FIG. 2 is an end view of body 10 showing a group 11 of plates 14. These plates are equidistant and parallel to each other, as well as parallel to the axis of revolution of cylindical body 10, each one of said plates forming an angle $\alpha$ different from 90° with the vertical plane containing said axis of revolution, said angle being preferably comprised between 45° and 70°.

Plates 15 of group 12 are arranged in a similar manner, but are inclined with respect to the above-mentioned vertical plane in a direction opposite to that of the inclination of plates 14, and symmetrically with respect to the latter; thus, plates 15 form with said vertical plane an angle $\alpha'$ equal to angle $\alpha$ (FIG. 2).

Due to this arrangement the solid matter which deposits on the surface of plates 14 and 15 slides rearwardly, i.e. toward the rear end of the device, as well as laterally toward the wall of the device, under the action of gravity.

The particles of solid matter are thus substantially prevented, during their descending movement, from encountering the upwardly directed flow of the liquid to be treated, whereby the clarification becomes more efficient. The device may comprise only one group of inclined plates; however it is more advantageous to provide two symmetrical inclined groups of plates as described herein-above.

Preferably the plates of each group are arranged at equal intervals; The interval between the plates of one group may be equal to or different from the intervals between the plates of the other group.

As shown in FIG. 5 the lower end of each plate may be bent upwardly to form a flange-like rim 16, so as to prevent the deposited solid matter from falling downwardly and to cause the same to flow toward the wall of the body or enclosure of the device.

FIGS. 3 and 4, respectively, show two different arrangements of the plates provided in a clarifying device according to the invention.

In the embodiment shown in FIG. 3, each plate 18 is bent along a bending line 19 so as to form a dihedron having an angle equal to $2\alpha$ at its apex; the plates of the group are arranged so as to be juxtaposed in such a manner that the bending lines 19, which are parallel to each other, are located in the vertical plane containing the axis of the cylindrical body 10; the surfaces of these plates are also parallel to each other, and the edges of each plate are fixed to the inner wall of the cylindrical body at a level lower than that of the associated bending line.

With this arrangement the same result as that described hereinbefore is achieved, and angle may be selected within the same limits as those set forth hereinabove with reference to the preceding embodiment.

In the embodiment shown in FIG. 4, the afore-mentioned plane containing the axis of revolution of cylindrical body 10 is materialized by one or two vertical wall members 20 dividing the cylindrical body 10 into two conduits each of which contains a group of parallel plates 21, 22 symmetrically inclined with respect to each other so as to form an angle $\alpha$ with said wall member 20, the apices of the angles formed between any two corresponding plates of groups 21, 22, respectively, being located in the vertical median plane defined by wall member, or members, 20, and said plates extending upwardly from said wall member toward the inner wall surface of cylindrical body 10.

In this particular embodiment the solid matter deposited on plates 21, 22 slides along the latter until it reaches wall member 20, whereby the same result as that described herein-above is also achieved.

According to the invention groups of plates such as those described herein-before and shown in the drawings may be provided in clarifying devices having a cylindrical enclosure, a parallelepipedic enclosure or an enclosure of any other similar convenient shape.

It is also within the scope of the invention to provide in a clarifying device such plates in combination with other elements such as one or more bundles of tubes through which the liquid to be treated is caused to flow. Such an arrangement is shown in FIG. 6. The clarifying device of FIG. 6 comprises a cylindrical body or enclosure 30 the lower portion of which contains two groups of decanting plates 31, 32 similar to those previously described herein, whereas the upper portion of said body 30 contains a bundle of tubes 33.

The ends of the body are closed by respective end walls 34 and 35; end wall 34 is provided with an inlet pipe 36 for the liquid to be treated and wall 35 is provided with an outlet pipe for the treated liquid. It will be understood that the clarifying device which may be operated under normal pressure conditions or under high pressure conditions may also include means for flocculating and recycling the solid matter to be separated from the liquid under treatment (such flocculating and recycling step is not shown in the Figures described up to now).

It should also be noted that the groups of plates 31, 32, 33 which are shown in the Figures as being separated by a certain interval in the direction of the geometrical axis of the body or enclosure of the clarifying device can also be mounted in such a manner that the downstream end of the lowermost group engages the upstream end of the uppermost group.

In the embodiment of FIG. 6 the inlet openings of the tubes 33 are located in a common plane 38 perpendicular to the axis of body 30.

Figure 7:
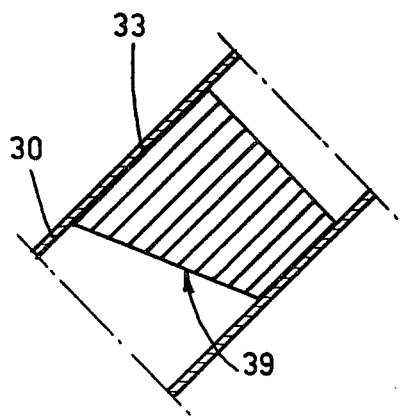
FIG. 7 shows a detail of a variant of the embodiment shown in FIG. 6.

In another advantageous embodiment shown in FIG. 7 the inlet openings of the tubes are located in a plane 39 inclined with respect to said axis in such a manner that said plane is located between the afore-mentioned plane perpendicular to the axis of body 30 and a horizontal plane. In this embodiment the deposited solid matter sliding downwardly within the upper tubes and issuing from the ends thereof is efficiently prevented from entering the lower tubes.

In this embodiment which comprises decanting plates arranged at an upstream location and decanting tubes arranged in a downstream location (with reference to the direction of flow of the liquid) a primary distribution and clarification is generally effected by the plates, while a final clarification is obtained by the tubes.

The device according to the invention is particularly adapted to be used in large-sized decanting installations which may be made substantially of concrete. An installation of this type is shown in FIG. 8.

Figure 8:
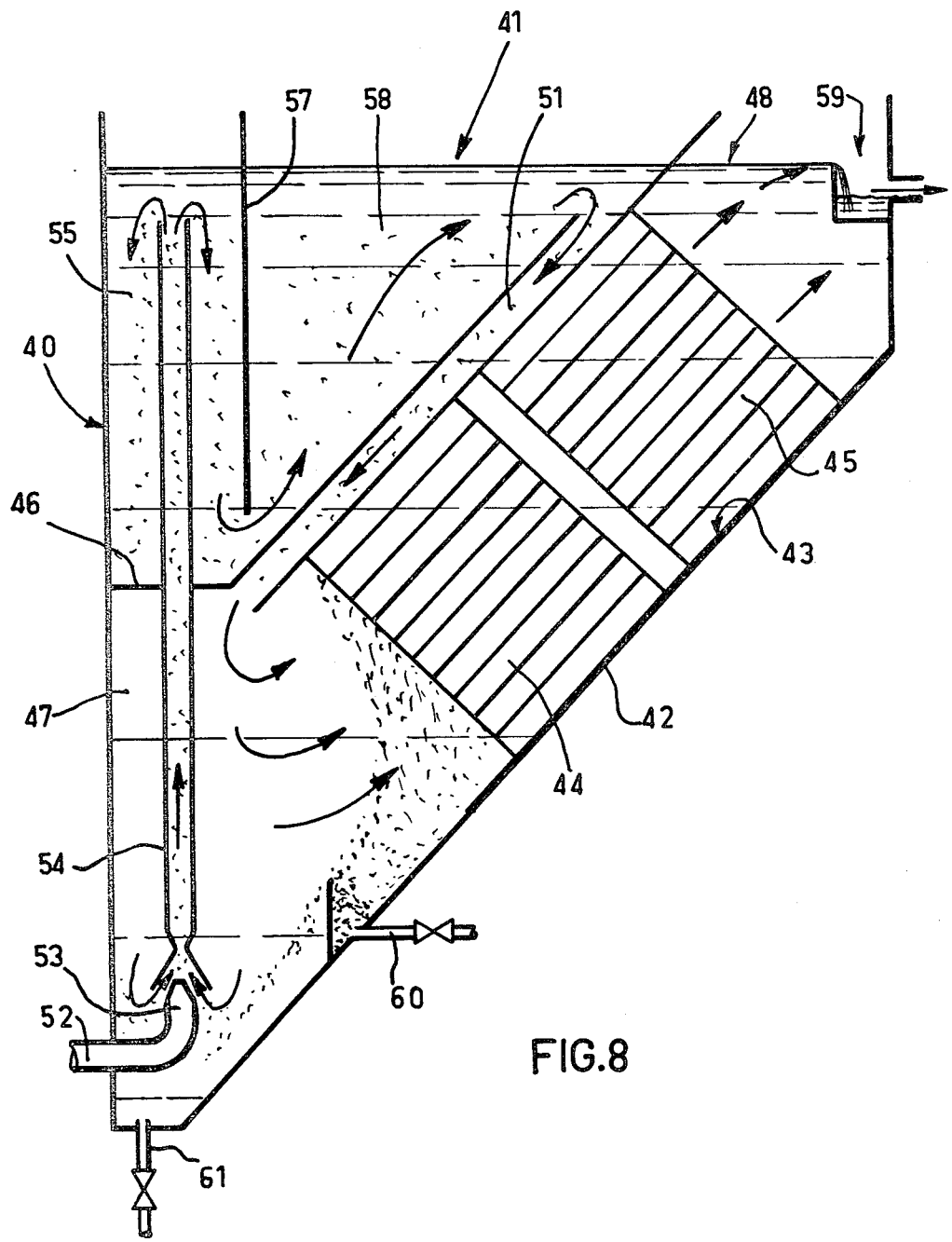
FIG. 8 shows yet another embodiment of the clarifying device according to the invention.

The installation of FIG. 8 comprises a vat 40 having a substantially triangular prismatic configuration, which is open at its upper end 41 and which comprises a caisson 43 having a square or rectangular cross-section and open ends, said caisson extending along an inclined wall 42 of vat 40. Caisson 43 contains groups of plates 44, 45. In a variant (not shown) said caisson also comprises decanting tubes arranged in a manner similar to that illustrated in FIG. 6 or 7. A separating wall 46 is connected substantially to the middle of the vertical wall 47 of vat 40 (opposite inclined wall 42) and extends upwardly along the upper wall of caisson 43 at a certain distance therefrom; the upper end of said separating wall being located below level 48 of the liquid to be treated which is contained in the vat. A passage 51 is provided between the separating wall 46 and the wall of the caisson.

An inlet conduit 52 for the liquid to be treated is provided at the lower part of vat 40 and a vertically extending open end portion 53 of said inlet conduit cooperates with a nozzle member 54 for recycling the deposited solid matter, which nozzle member extends through separating wall 46 and has its end located below the level 48 of the liquid to be treated, within a compartment 55 which is open at its lower end, said compartment being defined by a wall member 57 parallel to wall 47 of the vat. Wall member 57 further defines a second compartment 58 which communicates at its upper end with passage 51.

The device shown in FIG. 8 and described hereinabove operates as follows:

The liquid to be treated enters the device at 52 and issues from the open end of the vertical inlet conduit portion 53 whereafter it enters nozzle member 54 so as to effect a recycling of the deposited solid matter which is present in the lower part of vat 40. This recycled solid matter increases the weight of the depositing substances and thus confers to the latter a consistency which enhances the separation. It will be well understood that any device other than nozzle 54 may be used for recycling the solid matter; indeed, any convenient means allowing of obtaining a Mammoth effect may be used to this end, for instance, injection of air or injection of a mixture of air and a liquid.

A complementary floculation and an initial separation take place in compartments 55 and 58, whereafter the liquid flows through passage 51 toward the lower portion of caisson 43 wherein the clarification proper takes place. The solid substances will fall down onto the bottom of vat 40 and are then recycled or evacuated at 60.

The device may advantageously comprise a supplementary outlet 61 for the solid matter which may have accumulated at the bottom of the vat.

The clarified liquid is evacuated through outlet 59.

As in the previously described embodiments of the device according to the invention the separated solid matter flows or slides along the plates or the inner walls of the tubes and encounters only a minute portion of the upwardly directed flow of liquid to be treated.

It will be understood that the embodiments describes herein-above may be used when constructing new clarifying devices or decanters as well as when existing installations for the treatment of liquids loaded with solid substances and for the treatment of polluted water are to be modified. In this latter case, the decanting plates and the decanting tubes may be mounted in pre-manufactured caissons which are then mounted in the installations to be modified.

The size of the plates and the distance between the same as well as the diameter, and the length of the tubes may be varied and will be selected in accordance with the allowable flow velocity and output values, and in accordance with the nature of the solid matter to be separated.

The instant invention is by no means limited to the embodiments shown and described herein-before; numerous modifications may be made by any person skilled in the art without departing from the spirit and the scope of the invention as defined in the appended claims.

What is claimed is:

1. A process for clarifying a liquid loaded with suspended solid substances by decanting said substances, wherein the liquid to be treated is caused to flow along a flow path at least one portion of which is an upwardly directed flow path portion having a geometrical axis inclined with respect to the horizontal, said flow path portion being defined within an enclosure in which said liquid flows between plates arranged in at least two groups, each group containing substantially equidistant positioned plates disposed parallel to said inclined axis, said plates of each one of said groups being parallel to each other, and the parallel plates of each group forming with the vertical plane comprising said inclined axis an angle different from 90 degrees, while forming with the plates of the other group an angle of between about 20 degrees and 75 degrees, whereby the suspended substances are deposited on said plates and then slide downwardly thereon toward the wall of said enclosure.

2. A device for clarifying a liquid loaded with suspended solid substances by decanting said substances, comprising a substantially cylindrical enclosure body having a geometrical axis inclined with respect to the horizontal and defining an upwardly directed flow path for the liquid to be treated, said body containing at least two groups of substantially equidistant plates disposed parallel to said inclined axis, the plates of each one of said groups being parallel to each other and forming with the vertical plane containing said inclined axis an angle different from 90 degrees, and the plates of one of said groups forming with the plates of the other group an angle of between about 20 degrees and 75 degrees.

3. The device of claim 2, wherein said plates form an angle of about 45° to 70° with said vertical plane comprising said inclined axis.

4. The device of claim 2, wherein one of said groups of plates is located downstream of the other group.

5. The device of claim 2, wherein said two groups of plates are located on respective sides of said vertical plane, each plate of one of said groups being connected along a line located in said vertical plane to a corresponding plate of the other group.

6. The device of claim 5, comprising a wall member located within said cylindrical body and extending in said vertical plane and separating said two groups of plates.

7. The device of claim 2, further comprising a bundle of tubes disposed substantially parallel to each other and to said inclined geometrical axis, said tubes being located downstream of said plates.

8. The device of claim 2, further comprising means for floculating and recycling the solid substances separated from said liquid by decantation.

9. The device of claim 2, wherein each one of said plates has an upwardly bent portion at its lower end for causing solid substances to flow toward the wall of said enclosure body, while preventing said substances from falling downwardly from the lower ends of said plates.

10. The device of claim 7, wherein said ends of the tubes of said bundle are contained in a plane which forms an angle different from 90° with respect to said inclined geometrical axis of said cylindrical body, and which is located between a horizontal plane and a plane perpendicular to said inclined axis.

11. The device of claim 4, wherein said two groups of plates are juxtaposed so that the upstream end of the uppermost one of said groups engages the downstream end of the lowermost one of said groups.

12. The device of claim 4, wherein said two groups of plates are spaced from each other in the direction of said inclined geometrical axis of said cylindrical body.

13. The device of claim 2, wherein the plates of each one of said groups form with said vertical plane containing said inclined axis an angle of between about 45 degrees and 70 degrees.

14. The device of claim 7, wherein the tubes are provided with inlet openings located in a common plane substantially perpendicular to the axis of the cylindrical enclosure body.

* * * * *